United States Patent
Gu et al.

(10) Patent No.: US 8,582,840 B2
(45) Date of Patent: Nov. 12, 2013

(54) METHOD AND APPARATUS FOR THICKNESS COMPENSATION IN MAMMOGRAPHIC IMAGES

(75) Inventors: Kunlong Gu, Belmont, CA (US); Akira Hasegawa, Saratoga, CA (US); Huzefa Neemuchwala, Sunnyvale, CA (US)

(73) Assignee: FUJIFILM Corporation, Tokyo (JP)

( * ) Notice: Subject to any disclaimer, the term of this patent is extended or adjusted under 35 U.S.C. 154(b) by 1345 days.

(21) Appl. No.: 12/149,566

(22) Filed: May 5, 2008

(65) Prior Publication Data
US 2009/0003670 A1    Jan. 1, 2009

Related U.S. Application Data

(60) Provisional application No. 60/946,627, filed on Jun. 27, 2007.

(51) Int. Cl.
*G06K 9/00*   (2006.01)

(52) U.S. Cl.
USPC ............................................. 382/128; 378/37

(58) Field of Classification Search
USPC ....................... 382/128, 130, 132; 378/37, 62
See application file for complete search history.

(56) References Cited

U.S. PATENT DOCUMENTS

2001/0016030 A1*   8/2001   Nicolas et al. ............. 378/98.11

OTHER PUBLICATIONS

Stefanoyiannis et al., 2003, "A Digital Equalisation Technique Improving Visualisation of Dense Mammary Gland and Breast Periphery in Mammography" *European Journal of Radiology* 45:139-149.

Snoeren et al., 2004, "Thickness Correction of Mammographic Images by Means of a Global Parameter Model of the Compressed Breast", *IEEE Transactions on Medical Imaging* 23(7):799-806.

* cited by examiner

*Primary Examiner* — Hoon Song
(74) *Attorney, Agent, or Firm* — Birch, Stewart, Kolasch & Birch, LLP

(57) ABSTRACT

Methods and apparatuses perform thickness compensation in anatomical images. The method according to one embodiment accesses digital image data representing an image including a breast; estimates thickness of the breast at multiple locations inside the breast using an image data characteristic and a reference tissue in the breast; compensates thickness of the breast using a thickness model; and refines compensation of breast thickness from the compensating step.

35 Claims, 18 Drawing Sheets

METHOD AND APPARATUS FOR THICKNESS COMPENSATION IN MAMMOGRAPHIC IMAGES

CROSS REFERENCE TO RELATED APPLICATION

The present invention claims priority under 35 U.S.C. §119(e) of U.S. Provisional Application No. 60/946,627 filed Jun. 27, 2007, titled "Method and Apparatus for Thickness Compensation in Mammographic Images" the entire contents of which are herein incorporated by reference in their entirety.

BACKGROUND OF THE INVENTION

1. Field of the Invention

The present invention relates to a digital image processing technique, and more particularly to methods and apparatuses for processing medical images and for performing thickness compensation in medical images for anatomical objects.

2. Description of the Related Art

Mammograms are routinely acquired in hospitals, to screen for breast cancer or other breast abnormalities. A radiologist may analyze the mammograms using image attributes such as breast appearance, color, etc., to identify breast tumors, to observe differences between breasts images, to establish a baseline for the mammographic parenchyma of the patient, etc.

Typical/conventional processing techniques for mammographic images assume that a breast is compressed into an object of constant thickness in a mammography machine. With this assumption, grayscale values in a mammographic image are considered to be directly correlated to the structure of breast tissue.

The assumption that the breast is compressed into an object of constant thickness in a mammography machine is not correct, however. For example, the thickness of the breast gradually decreases in peripheral areas of a compressed breast, such as in areas found at the skin line. In addition, the plates compressing the breast are not parallel in some mammogram scanners. For these and other reasons, a large portion of the compressed breast area does not actually satisfy the assumption of constant thickness. Thickness variation of a compressed breast leads to differences in exposure in the mammography scanner. Hence, the resulting mammography image does not image a constant thickness breast. Breast thickness variation associated with the mammography image and complex color variation in the mammography image degrade performance of subsequent CAD processes applied to the image.

Disclosed embodiments of this application address these and other issues by performing thickness compensation for anatomical objects, such as breast images compressed in a mammography machine. A layer map is generated for a breast and layer thickness within each layer is estimated. Embodiments of this application use a model based thickness estimate method, followed by relaxed global refinement. When used for breast thickness compensation, the model and outlier detection take into account properties of breast tissue and of breast compression. A strong model assumption is used for initial breast thickness compensation, and weak assumptions are used to refine thickness estimation. The refinement step performed after the model based thickness estimation process takes into account characteristics of breast compression and imposes fewer constraints. In a preferred embodiment, the compensating step estimates layer thickness for the breast image using a semi-circle thickness model, and uses a logistic model to initialize a semi-circle estimate. The methods and apparatuses of the present invention may be applied to images of breasts and to images of other anatomical objects besides breasts.

SUMMARY OF THE INVENTION

The present invention is directed to methods and apparatuses for thickness compensation in anatomical images. According to a first aspect of the present invention, an image processing method comprises: accessing digital image data representing an image including a breast; estimating thickness of the breast at multiple locations inside the breast using an image data characteristic and a reference tissue in the breast; compensating thickness of the breast using a thickness model; and refining compensation of breast thickness from the compensating step.

According to a second aspect of the present invention, an image processing apparatus comprises: an image data input unit for accessing digital image data representing an image including a breast; a thickness estimation unit for estimating thickness of the breast at multiple locations inside the breast using an image data characteristic and a reference tissue in the breast; a compensation unit for compensating thickness of the breast using a thickness model; and a refinement unit for refining compensation of breast thickness from the compensation unit.

According to a third aspect of the present invention, an image processing method comprises: accessing digital image data representing an image including an anatomical object; estimating thickness of the anatomical object at multiple locations inside the object using an object image data characteristic and a reference tissue in the object; compensating thickness of said object using a thickness model; and refining compensation of object thickness.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
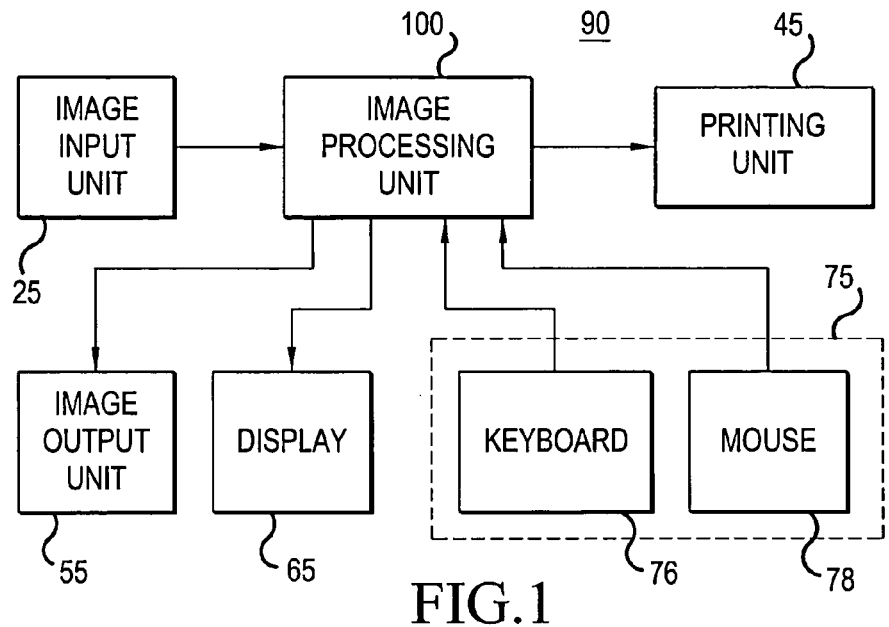
FIG. 1 is a general block diagram of a system including an image processing unit for thickness compensation according to an embodiment of the present invention.

Aspects of the invention are more specifically set forth in the accompanying description with reference to the appended figures.

In one aspect, the present invention relates to methods and apparatuses that perform thickness compensation in a medical image for an object such as a breast.

Typical/conventional processing techniques for mammographic images assume that a breast is compressed into an object of constant thickness in a mammography machine. The assumption that the breast is compressed into an object of constant thickness in a mammography machine is not, however, correct. For example, the thickness of the breast gradually decreases in peripheral areas of a compressed breast, such as in areas found at the skin line. In addition, the two plates compressing the breast are not parallel in some mammography scanners. Hence, a large portion of a compressed breast does not have a constant thickness.

In the present invention, breast thickness compensation is performed using reference breast information. Available tissue information and/or segmentation data for the breast are used for thickness reference and for compensation. A strong model assumption is used for initial thickness compensation. The model may be a breast shape model, or other type of model. Refining compensation for breast thickness is then performed using weak assumptions.

In one embodiment of the present invention, a thickness equalization (compensation) technique includes two major steps: performing compensation of the breast region based on a layer model, and then performing a relaxed global refinement procedure. A layer model remaps the grayscale levels of imaged breast layers using correction factors that account for thickness variation in the breast. The relaxed refinement corrects residue fluctuations that were not addressed in the compensation step. A correction factor may be calculated based on the grayscale levels of fatty areas which represent highly homogeneous tissue in breasts. Hence, this thickness compensation technique fills portions of breast layers with fatty tissue in such a way that the resulting breast has a substantially constant thickness across layers.

In one embodiment of the present invention, a layer model for the breast is built using a polynomial constraint, in a manner similar to that described in "A Digital Equalization Technique Improving Visualization of Dense Mammary Gland and Breast Periphery in Mammography," by A. Stefanoyiannis et al., European Journal of Radiology 45 (2003), pages 139-149, the entire contents of which are hereby incorporated by reference. In contrast to the technique described by A. Stefanoyiannis, however, the present invention uses tissue information and/or breast segmentation data in the layer model, to improve reliability. The layer model of this embodiment in the present invention imposes a weak constraint, and, except for a smoothness assumption, does not apply physical a priori knowledge to compression of breasts.

The breast thickness equalization technique described above performs well when breast observation data is reliable, but may encounter problems when the breast tissue segmentation used in the model is inaccurate. In another, preferred embodiment of the present invention, performance of thickness compensation is improved using models that impose strong constraints, based on characteristics of physical compression of breasts. Such models guarantee global characteristics of estimated thickness changes, and allow outlier detection to reduce sensitivity against unreliable data.

A strong constraint in the breast compression model corrects for thickness variation in a compressed breast. However, a strong constraint, and the underlying assumptions associated with the constraint are not satisfied in some cases. To address such cases, breast thickness compensation is improved by relaxing the constraint placed on the image output from the layer model compensation step. This refinement step uses global characteristics of thickness change in breasts, to compensate for residue fluctuation.

FIG. 1 is a general block diagram of a system including an image processing unit for thickness compensation according to an embodiment of the present invention. The system 90 illustrated in FIG. 1 includes the following components: an image input unit 25; an image processing unit 100; a display 65; an image output unit 55; a user input unit 75; and a printing unit 45. Operation of the system 90 in FIG. 1 will become apparent from the following discussion.

Image input unit 25 provides digital image data representing medical images. Medical images may be mammography images, X-ray images of various parts of the body, etc. Image input unit 25 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

Image processing unit 100 receives digital image data from the image input unit 25 and performs thickness compensation in a manner discussed in detail below. A user, e.g., a radiology specialist at a medical facility, may view the output of image processing unit 100, via display 65 and may input commands to the image processing unit 100 via the user input unit 75. In the embodiment illustrated in FIG. 1, the user input unit 75 includes a keyboard 76 and a mouse 78, but other conventional input devices could also be used.

In addition to performing thickness compensation in accordance with embodiments of the present invention, the image processing unit 100 may perform additional image processing functions in accordance with commands received from user input unit 75. The printing unit 45 receives the output of the image processing unit 100 and generates a hard copy of the processed image data. In addition or as an alternative to generating a hard copy of the output of the image processing unit 100, the processed image data may be returned as an image file, e.g., via a portable recording medium or via a network (not shown). The output of image processing unit 100 may also be sent to image output unit 55 that performs further operations on image data for various purposes. The image output unit 55 may be a module that performs further processing of the image data, a database that collects and compares images, etc.

Figure 2:
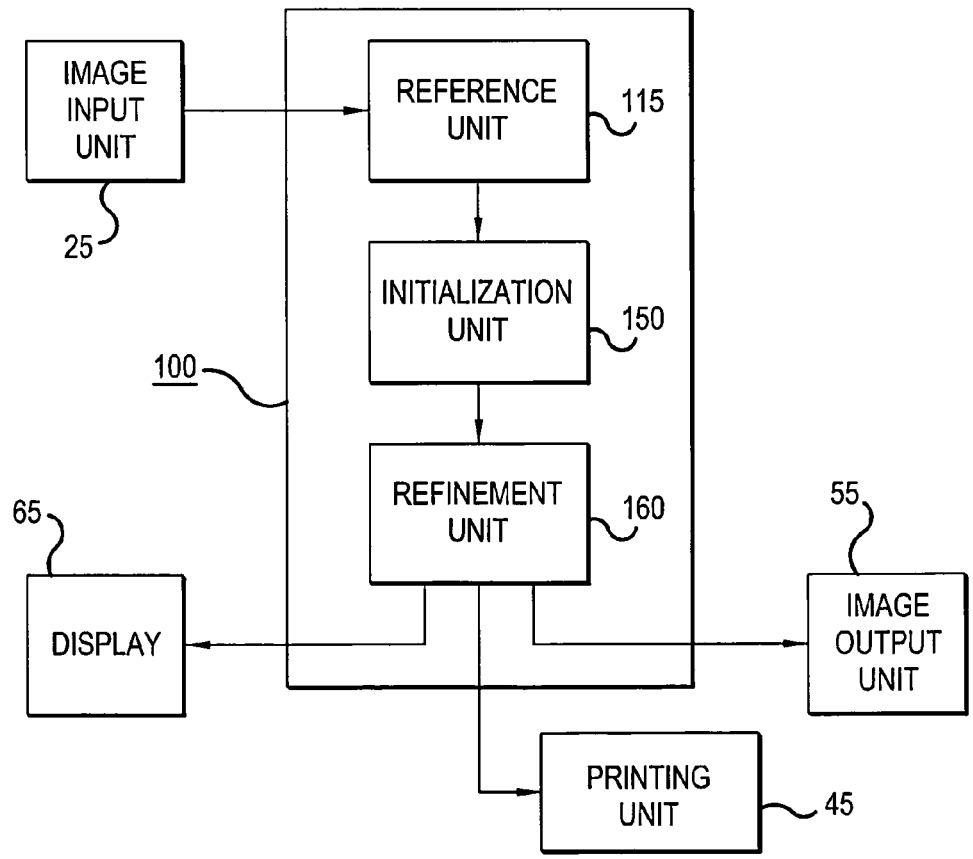
FIG. 2 is a block diagram illustrating in more detail aspects of the image processing unit for thickness compensation in mammography images according to an embodiment of the present invention.

FIG. 2 is a block diagram illustrating in more detail aspects of the image processing unit 100 for thickness compensation in mammography images according to an embodiment of the present invention. As shown in FIG. 2, the image processing unit 100 according to this embodiment includes: a reference unit 115; an initialization unit 150; and a refinement unit 160. Although the various components of FIG. 2 are illustrated as discrete elements, such an illustration is for ease of explanation and it should be recognized that certain operations of the various components may be performed by the same physical device, e.g., by one or more microprocessors.

Operation of image processing unit 100 will be next described in the context of mammography images, for thickness equalization in mammography images. However, the principles of the current invention apply equally to other areas of medical image processing, for thickness equalization on other medical images besides mammography images.

In one embodiment, the arrangement of elements for the image processing unit 100 illustrated in FIG. 2 performs breast thickness compensation using strong and weak assumptions. Reference unit 115 receives a breast image from image input unit 25 and may perform preprocessing and preparation operations on the breast image. Preprocessing and preparation operations performed by reference unit 115 may include resizing, cropping, image compression, color correction, noise reduction, etc., that change size and/or appearance of the breast image. Reference unit 115 extracts available tissue information and/or segmentation data for the breast. The tissue information and/or segmentation data will be used for thickness reference and compensation.

Initialization unit 150 uses a strong model assumption to perform initial thickness compensation for the breast. The model may be a breast shape model, or other type of model. Refinement unit 160 then refines compensation for breast thickness, using weak assumptions. The output of refinement unit 160 may be sent to image output unit 55, printing unit 45, and/or display 65.

Reference unit 115, initialization unit 150, and refinement unit 160 are software systems/applications. Reference unit 115, initialization unit 150, and refinement unit 160 may also be purpose built hardware such as FPGA, ASIC, etc.

Figure 3A:
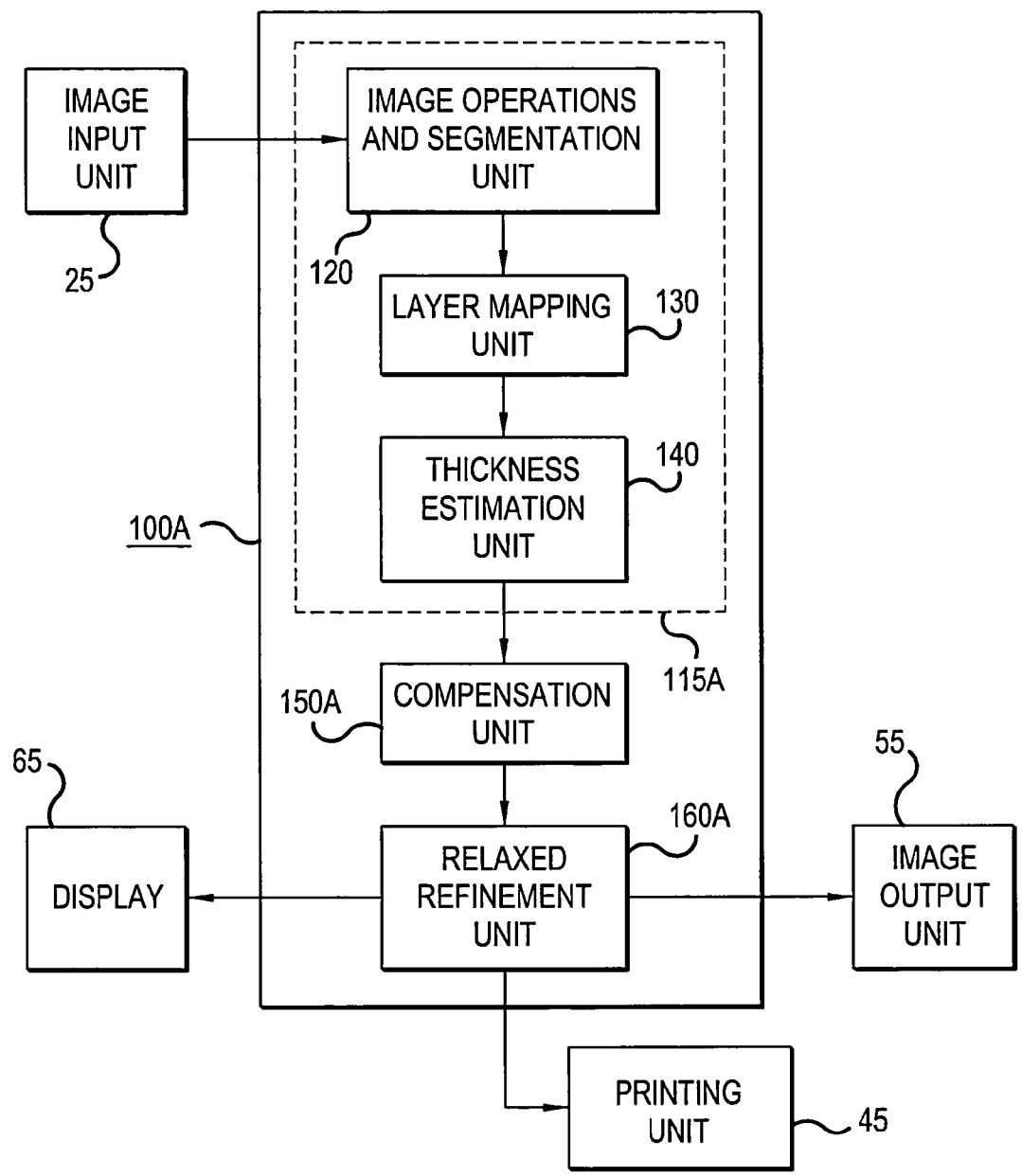
FIG. 3A is a block diagram illustrating aspects of an image processing unit for thickness compensation in mammography images according to a preferred embodiment of the present invention.
Figure 3B:
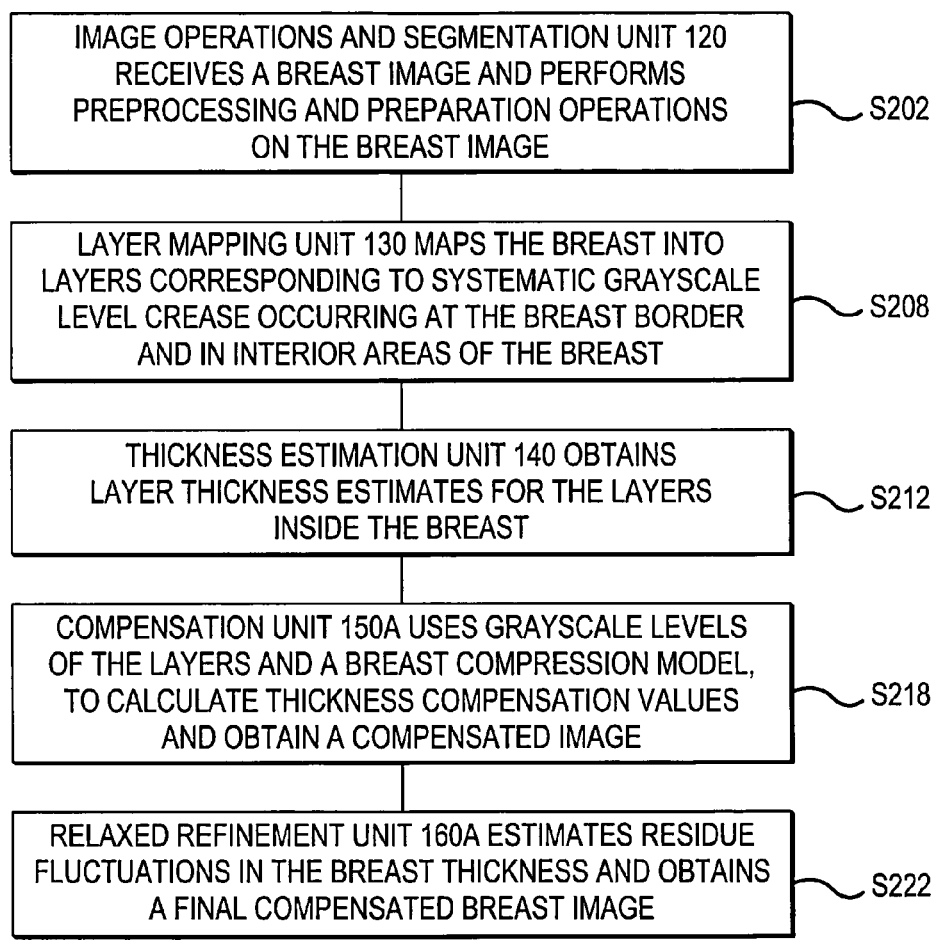
FIG. 3B is a flow diagram illustrating operations performed by an image processing unit for thickness compensation in mammography images according to an embodiment of the present invention illustrated in FIG. 3A.

FIG. 3A is a block diagram illustrating aspects of an image processing unit 100A for thickness compensation in mammography images according to a preferred embodiment of the present invention. FIG. 3B is a flow diagram illustrating operations performed by image processing unit 100A for thickness compensation in mammography images according to an embodiment of the present invention illustrated in FIG. 3A.

As shown in FIG. 3A, the image processing unit 100A according to this embodiment includes: an image operations and segmentation unit 120; a layer mapping unit 130; a thickness estimation unit 140; a compensation unit 150A; and a relaxed refinement unit 160A. Although the various components of FIG. 3A are illustrated as discrete elements, such an illustration is for ease of explanation and it should be recognized that certain operations of the various components may be performed by the same physical device, e.g., by one or more microprocessors.

Operation of image processing unit 100A will be next described in the context of mammography images, for thickness equalization in mammography images. However, the principles of the current invention apply equally to other areas of medical image processing, for thickness equalization in other medical images besides breast images.

In one embodiment, the arrangement of elements for the image processing unit 100A illustrated in FIG. 3A performs preprocessing and preparation of digital image data including a breast image, layer mapping for the breast image, layer thickness estimation for the breast image, thickness compensation (or equalization) for the breast image, and relaxed global refinement for breast thickness. Image operations and segmentation unit 120 receives a breast image from image input unit 25 and may perform preprocessing and preparation operations on the breast image (S202). Preprocessing and preparation operations performed by image operations and segmentation unit 120 may include resizing, cropping, image compression, image correction, noise reduction, etc., that change size and/or appearance of the breast image. Image operations and segmentation unit 120 also segments the breast image to obtain a breast mask and a breast tissue mask. The breast mask identifies the breast in the image. The breast tissue mask identifies tissue type in the breast image.

Image operations and segmentation unit 120 sends the preprocessed breast image to layer mapping unit 130 which maps the breast into layers corresponding to systematic grayscale level decrease occurring at the breast border and in interior areas of the breast (S208). Thickness estimation unit 140 receives an image with mapped layers, and obtains layer thickness estimates for the layers inside the breast (S212). Compensation unit 150A uses grayscale levels of the layers and a breast compression model, to calculate thickness compensation values. A compensated image is obtained by adding compensation levels back to corresponding layers of the original breast image (S218). Relaxed refinement unit 160A estimates residue fluctuations in the breast thickness of the image output from compensation unit 150A, and obtains a final compensated breast image (S222).

The output of relaxed refinement unit 160A may be sent to image output unit 55, printing unit 45, and/or display 65. Operation of the components included in the image processing unit 100A illustrated in FIG. 3A will be next described with reference to FIGS. 4-14B.

Image operations and segmentation unit 120, layer mapping unit 130, thickness estimation unit 140, compensation unit 150A, and relaxed refinement unit 160A are software systems/applications. Image operations and segmentation unit 120, layer mapping unit 130, thickness estimation unit 140, compensation unit 150A, and relaxed refinement unit 160A may also be purpose built hardware such as FPGA, ASIC, etc.

Figure 4:
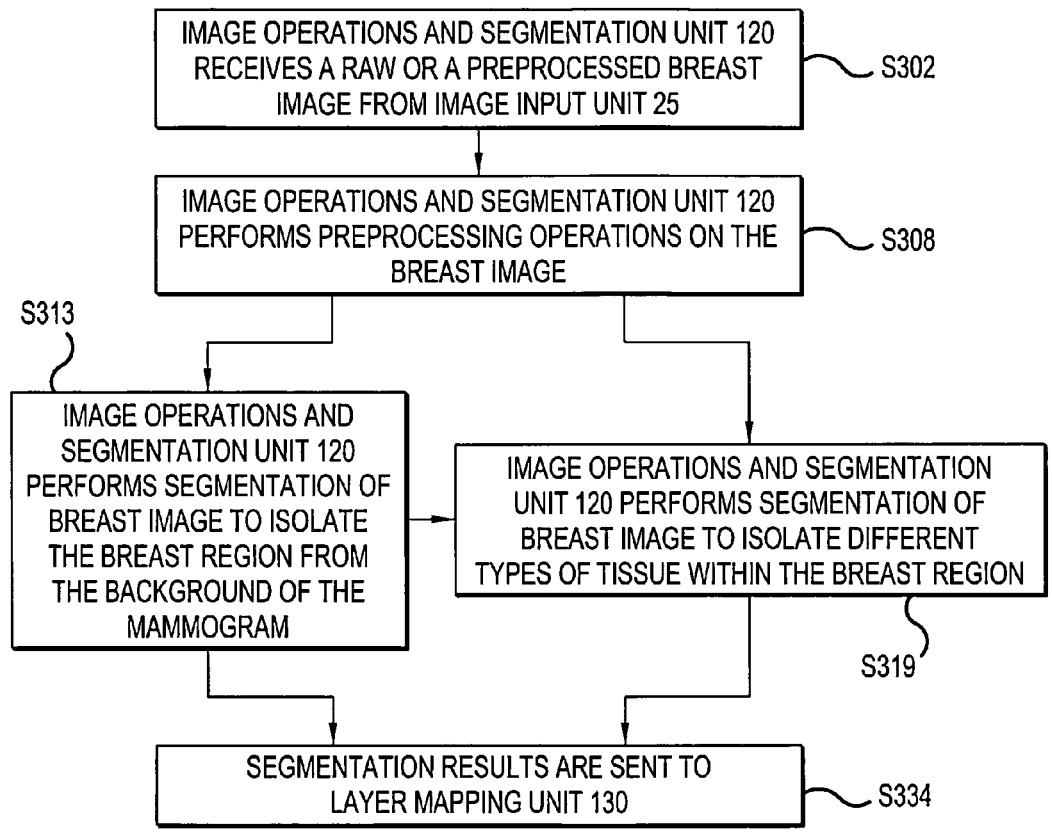
FIG. 4 is a flow diagram illustrating operations performed by an image operations and segmentation unit included in an image processing unit for thickness compensation in mammography images according to an embodiment of the present invention illustrated in FIG. 3A.

FIG. 4 is a flow diagram illustrating operations performed by an image operations and segmentation unit 120 included in an image processing unit 100A for thickness compensation in mammography images according to an embodiment of the present invention illustrated in FIG. 3A.

Image operations and segmentation unit 120 receives a raw or a preprocessed breast image from image input unit 25 (S302), and may perform preprocessing operations on the breast image (S308). Preprocessing operations may include extracting a region of interest (ROI) from the breast image, performing other image processing operations such as image resizing, etc. Image operations and segmentation unit 120 also performs segmentation of mammography images. In a mammogram, segmentation is used to isolate the breast region from the background of the mammogram (S313). Segmentation also isolates different tissue segments (different types of tissue) within the breast region (S319).

The segmentation process provides important information for thickness correction. Such information includes identification of a region in the breast and identification of a region of reference.

Image operations and segmentation unit 120 may perform breast segmentation from the background (to obtain a mask of the breast) using methods described in the U.S. patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. Other breast segmentation methods may also be used.

Previously determined or learned information on tissue type may be used to perform tissue segmentation. Tissue segmentation may also be performed using methods described in the following U.S. patent applications: U.S. patent application titled "Mass Segmentation Using Mirror Image of Region of Interest", application Ser. No. 11/642,921, by Chao Shi and Daniel Russakoff, filed on 21 Dec. 2006, the entire contents of which are hereby incorporated by reference; U.S. patent application titled "Method and Apparatus for Detection Using Cluster-Modified Graph Cuts", application Ser. No. 11/633,571, by Huzefa Neemuchwala, filed on 5 Dec. 2006, the entire contents of which are hereby incorporated by reference; U.S. patent application titled "Method and Apparatus for Detection Using Gradient-Weighted and/or Distance-Weighted Graph Cuts", application Ser. No. 11/633,534, by Huzefa Neemuchwala, filed on 5 Dec. 2006, the entire contents of which are hereby incorporated by reference. Other techniques may also be used to perform tissue segmentation.

The segmentation results (such as a breast mask and a breast tissue mask) are sent to layer mapping unit 130 (S334).

Figure 5A:
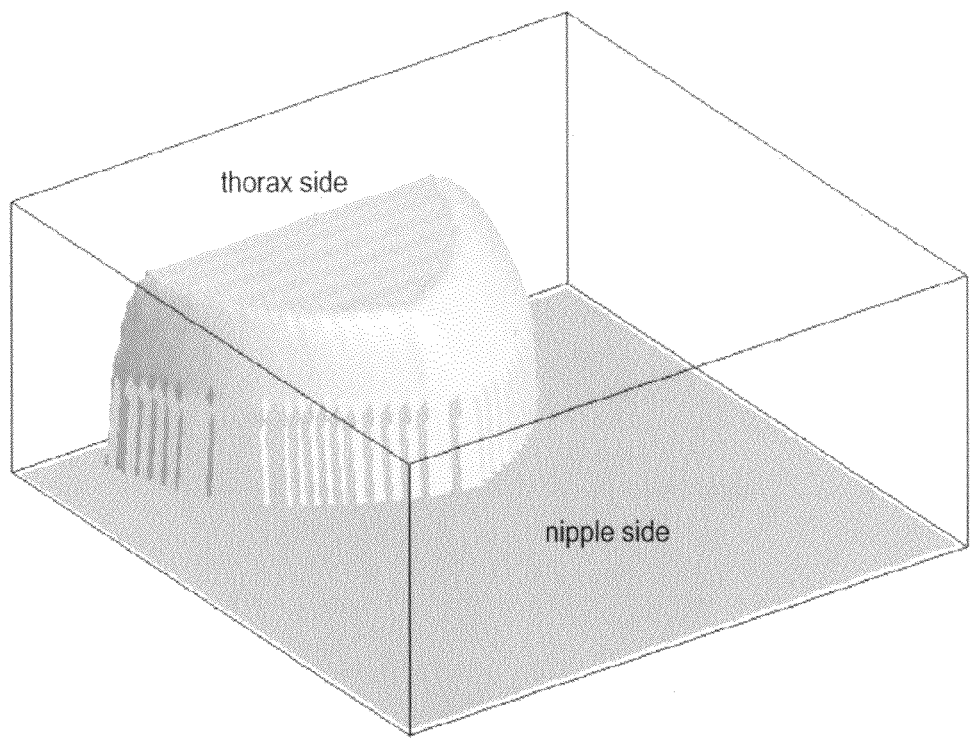
FIG. 5A illustrates a 3D thickness model of a compressed breast.

FIG. 5A illustrates a 3D thickness model of a compressed breast. The model for the compressed breast consists of two areas: an interior area and a border area. The interior area is formed by compression planes of a mammogram scanner. In some mammogram scanners, these planes are non-parallel, causing a linear variation in breast thickness. The border area is the periphery area of a compressed breast. The thickness of the border area decreases non-linearly towards the edge of the breast.

Figure 5B:
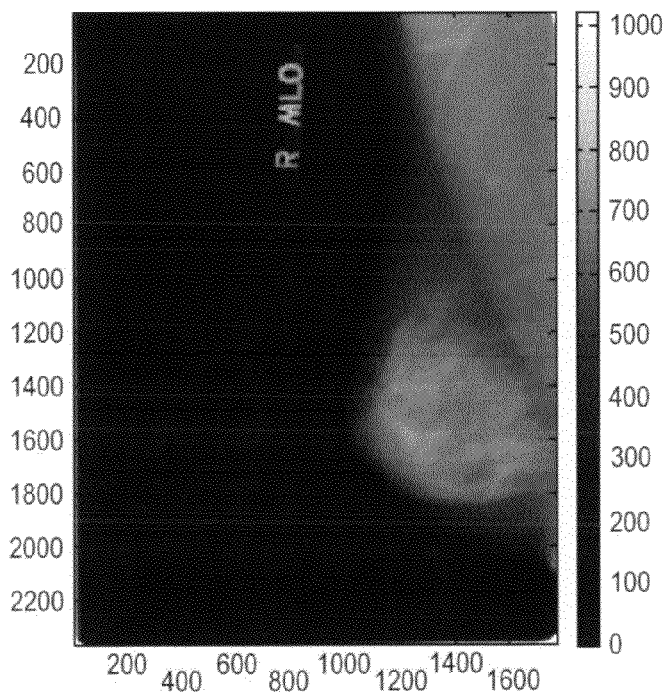
FIG. 5B illustrates a mammogram image obtained with a mammography system.

FIG. 5B illustrates a mammogram image obtained with a mammography machine. The mammography machine compresses the breast and obtains an image of the compressed breast. Since the thickness of the breast is not uniform, the average grayscale level for the breast in FIG. 5B decreases radially towards the skin line. Diagnosis of breast abnormalities uses inferences about tissue type inside the breast. Diagnosis assumes that the grayscale level, or the attenuation coefficient (for irradiation of the breast during imaging) for the breast image, is only related to the tissue property or type. However, as illustrated in FIG. 5A, the thickness of a breast is non-uniform in a mammogram image. Hence, the grayscale level for a breast image is determined by the breast tissue property/type, as well as the variable thickness of the breast. Consequently, breast thickness variation can degrade CAD performance, especially for breast border areas.

Figure 5D:
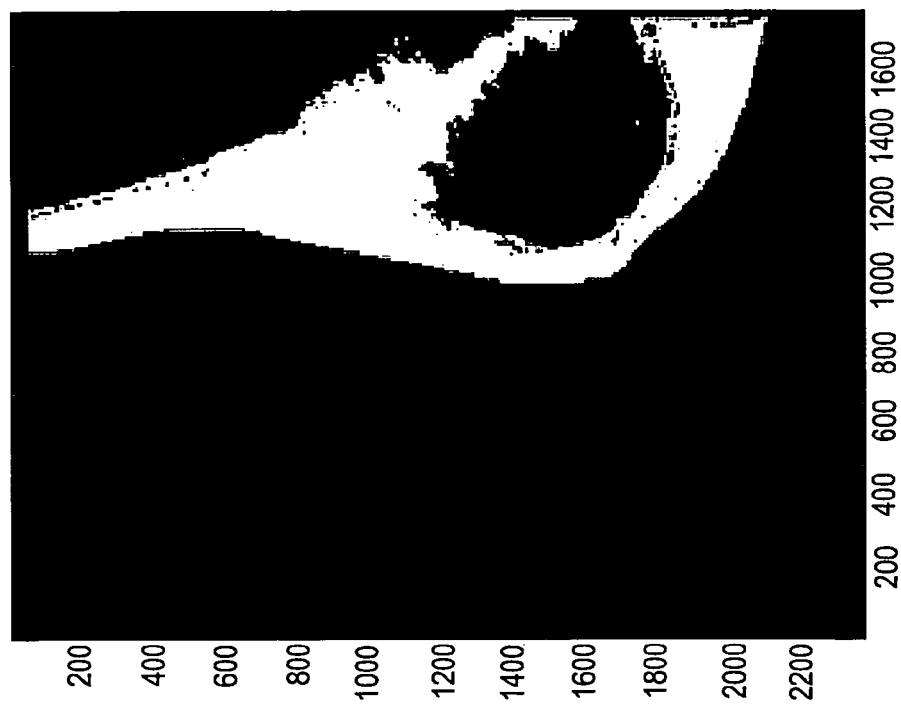
FIG. 5D illustrates a tissue mask obtained in accordance with principles of the present invention.
Figure 5C:
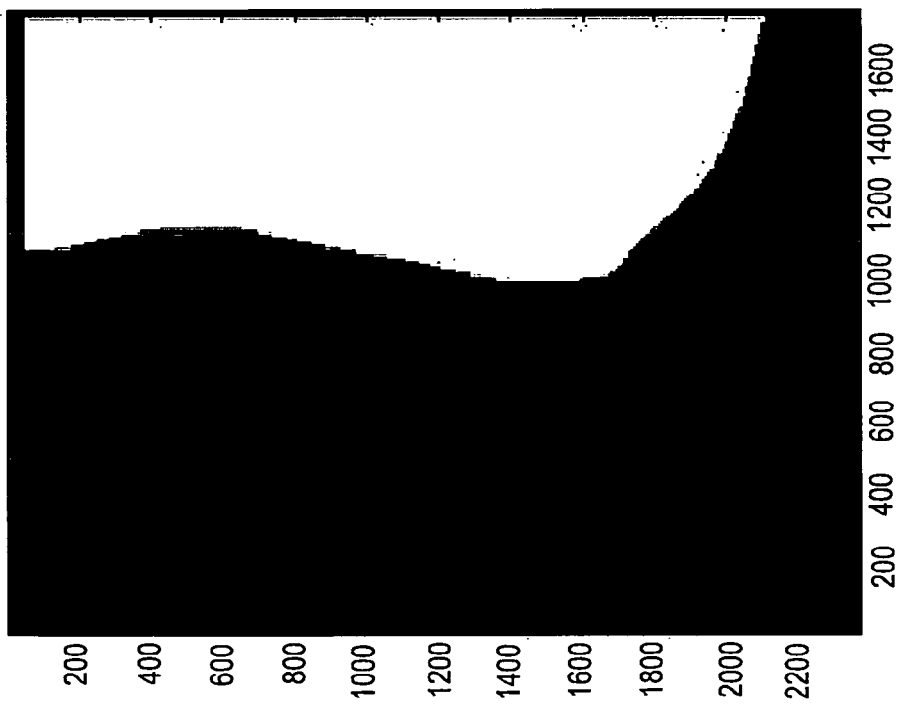
FIG. 5C illustrates a mask of the breast area obtained in accordance with principles of the present invention.

Exemplary segmentation results are illustrated in FIGS. 5C and 5D. A region of the breast (a mask of the breast area) is illustrated in FIG. 5C, and a mask of tissue for the breast associated with FIG. 5C is illustrated in FIG. 5D. FIG. 5D illustrates only fatty tissue, which is used as a region of reference.

Figure 6:
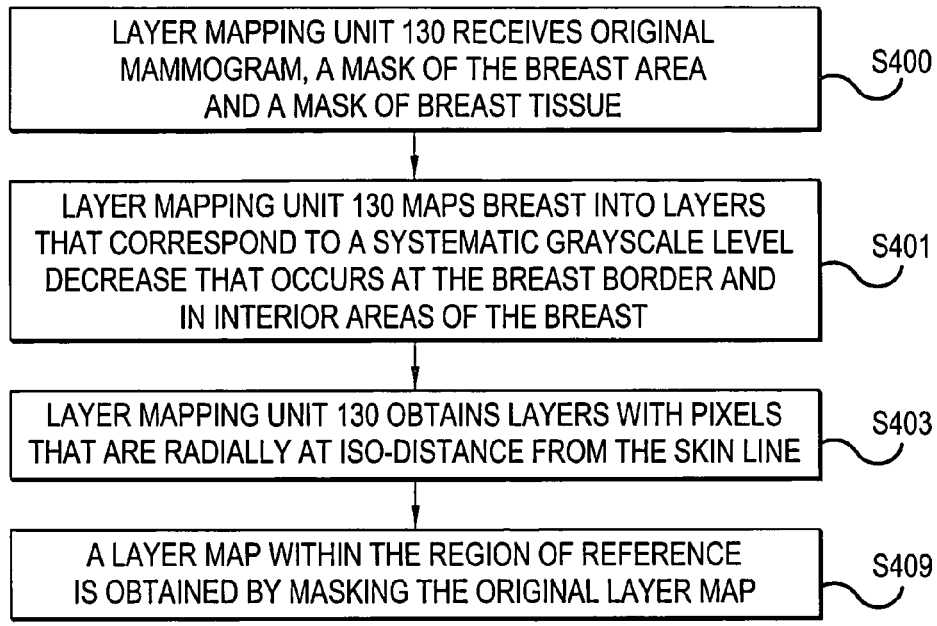
FIG. 6 is a flow diagram illustrating operations performed by a layer mapping unit included in an image processing unit for thickness compensation in mammography images according to an embodiment of the present invention illustrated in FIG. 3A.

FIG. 6 is a flow diagram illustrating operations performed by a layer mapping unit 130 included in an image processing unit 100A for thickness compensation in mammography images according to an embodiment of the present invention illustrated in FIG. 3A.

In the present invention, thickness compensation uses the assumption that breast thickness stays substantially the same along iso-distance lines from the skin line. Also, a reference tissue is used to estimate thickness. Reference tissue may be selected from tissue with a homogeneous X-ray attenuation coefficient, and from tissue that occupies a large portion of the breast region. Fatty tissue is a good candidate for reference tissue.

The original mammogram, a mask of the breast area and a mask of breast tissue are sent the layer mapping unit 130, which performs adaptive layer mapping. Layer mapping unit 130 generates a layer map and estimates layer thickness within each layer.

The layer mapping unit 130 maps the breast into layers that correspond to systematic grayscale level decrease that occurs at the breast border and in interior areas of the breast (S401). Each layer contains pixels that are radially at iso-distance from the skin line (S403). In an exemplary embodiment, the layers are derived by an Euclidean distance transform. A layer map within the region of reference is also obtained by masking the original layer map (S409).

Figures 7A, 7B:
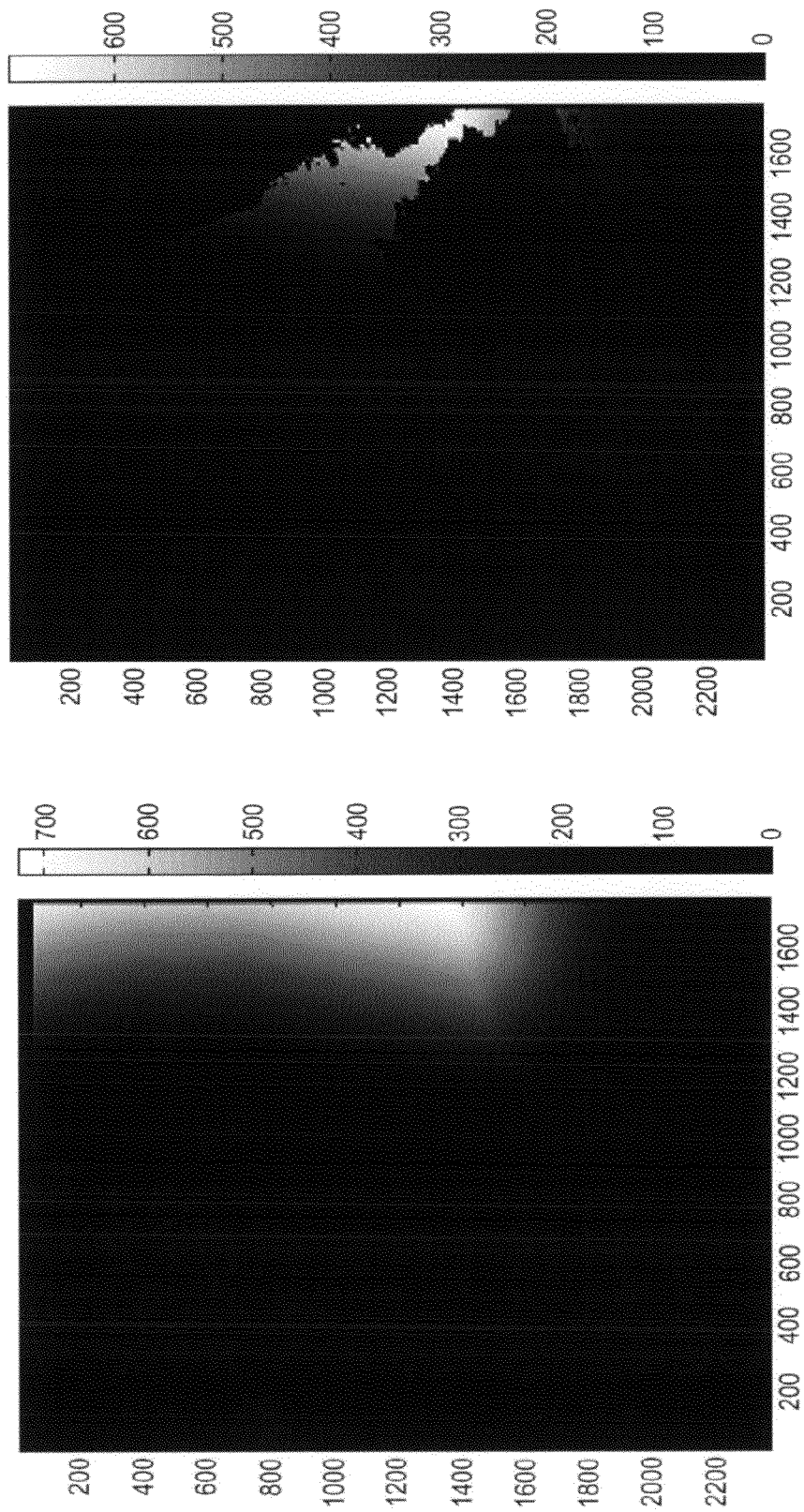
FIG. 7A illustrates a layer map of breast area obtained in accordance with principles of the present invention.
FIG. 7B illustrates a layer map of a reference area obtained in accordance with principles of the present invention.

An exemplary image of layers (layer map) derived by Euclidean distance transform is illustrated in FIG. 7A. A layer map within the region of reference is illustrated in FIG. 7B. FIG. 7B illustrates a layer map of the reference area illustrated in FIG. 5D. The layer map within the region of reference can be obtained by masking the original layer map using the region of reference.

Figure 8:
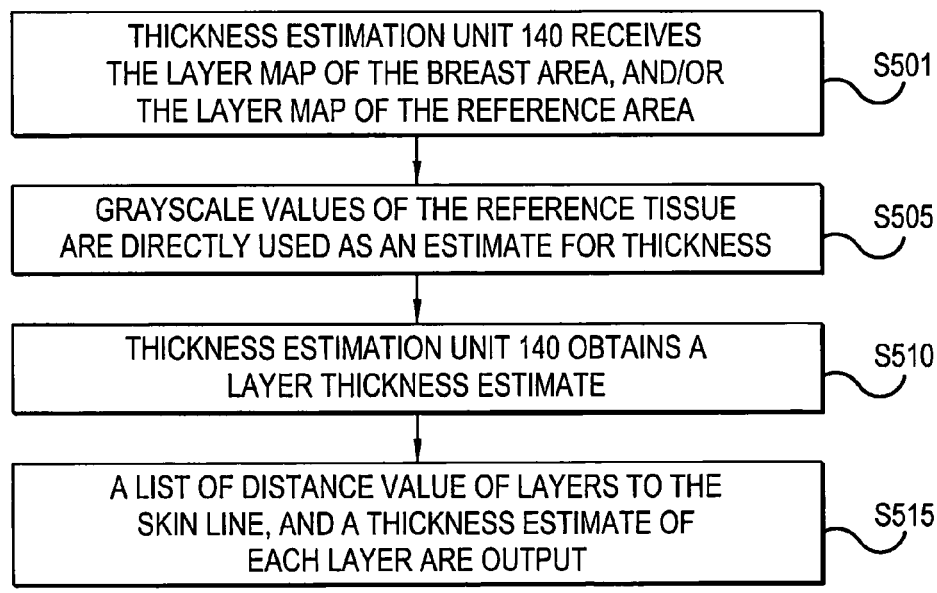
FIG. 8 is a flow diagram illustrating operations performed by a thickness estimation unit included in an image processing unit for thickness compensation in mammography images according to an embodiment of the present invention illustrated in FIG. 3A.
Figure 10A:
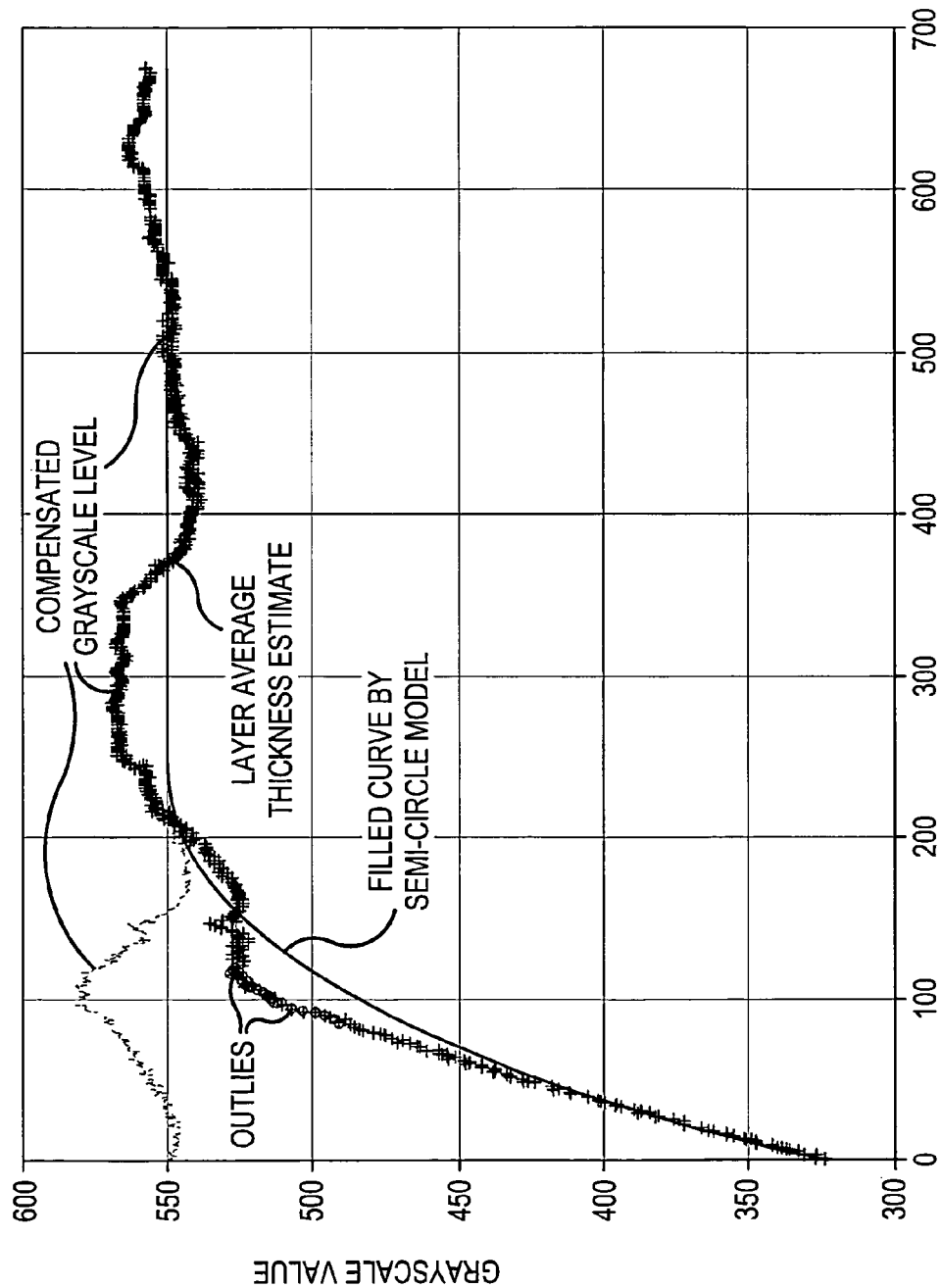
FIG. 10A illustrates a thickness estimate curve, a semi-circle model fitted curve, and a compensated grayscale level curve obtained in accordance with principles of the present invention.

FIG. 8 is a flow diagram illustrating operations performed by a thickness estimation unit 140 included in an image processing unit 100A for thickness compensation in mammography images according to an embodiment of the present invention illustrated in FIG. 3A. Thickness estimation unit 140 receives the layer map of the breast area, and/or the layer map of the reference area (S501), and obtains a layer thickness estimate (S510). The average (or median) grayscale level of the reference tissue, defined by the region of reference, systematically decreases from the mammary gland towards the skin line, as illustrated in FIG. 10A for an exemplary thickness estimate curve. Since grayscale values are linearly related to the attenuation coefficient of the tissue, and the reference tissue is homogeneous, grayscale values of the reference tissue are directly used as an estimate for thickness (S505).

In the exemplary graph of FIG. 10A, a layer average thickness estimate curve is obtained with a median grayscale value that is calculated for the reference data (for example, for fatty tissue) of each layer, to obtain a layer thickness estimate for each layer. Hence, the median grayscale value of each layer is used as estimate of that layer's thickness. Other methods for estimating layer thickness can also be used together with, or instead of the median grayscale value method. Layer thickness estimation may stop at a layer which does not include enough reference points. A list of distance values of layers to the skin line, and a thickness estimate of each layer are output (S515). These values and estimates are further used for thickness estimation and compensation.

Figure 9:
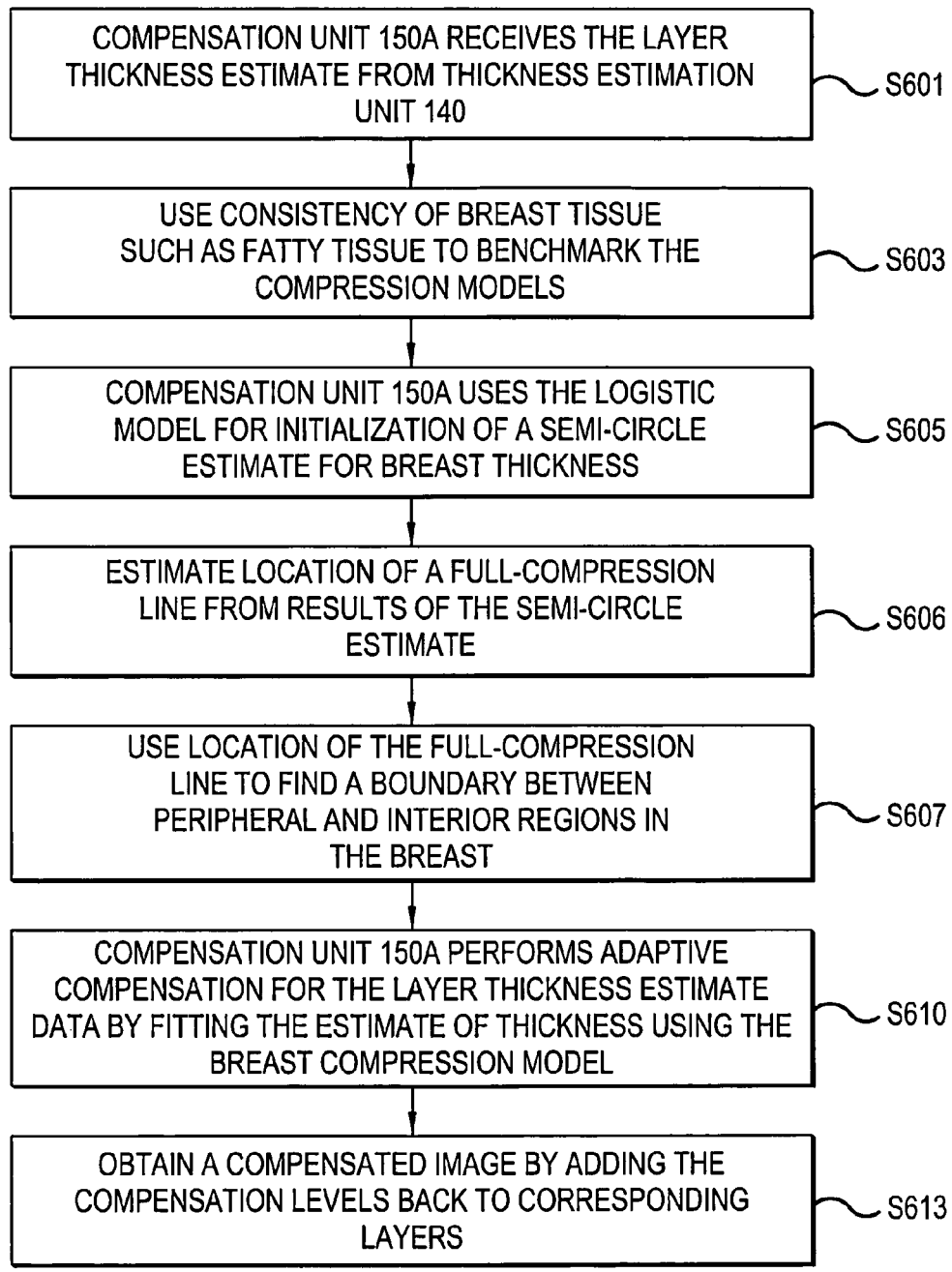
FIG. 9 is a flow diagram illustrating operations performed by a compensation unit included in an image processing unit for thickness compensation in mammography images according to an embodiment of the present invention illustrated in FIG. 3A.

FIG. 9 is a flow diagram illustrating operations performed by a compensation unit 150A included in an image processing unit 100A for thickness compensation in mammography images according to an embodiment of the present invention illustrated in FIG. 3A.

Compensation unit 150A receives the layer thickness estimate from thickness estimation unit 140 (S601), and performs adaptive compensation for the breast image. To perform adaptive compensation for the layer thickness estimate data, the estimate of thickness is fitted using a breast compression model (S610), to obtain a continuous curve. Thickness of layers may be used to estimate compression model parameters.

A physical breast compression model takes into account properties of the breast compression process, and properties of fatty and dense tissues in breasts. A property of a compressed breast is that the thickness of the compressed breast is typically a smooth monotonically increasing function of distance to skin line. Another property is that the thickness of the breast is bounded by the distance between the two compression plates. A third property is that breast thickness increases rapidly and reaches an upper bound. A fourth property is that, at the same thickness level, the attenuation coefficient, or the grayscale in a mammography image, is smaller in fatty tissue than in dense tissue. A fifth property is that a reference region which is very close to the skin line is relatively more reliable for thickness estimation, because this region typically contains only fatty tissue. In an exemplary embodiment, the first three properties are reflected in a breast thickness model, and the last two properties may be used for outlier detection.

A physical compression model of the present invention is based on global properties of observation data (breast data). Local errors in thickness estimation may occur. For example, when breast thickness increases rapidly from the skin line, local thickness estimation errors may occur. In such cases, a "halo" may appear on a compensated breast image, because of over-compensation. However, initial thickness observation data at small distances from skin line is typically reliable. Such initial thickness observation data can be used directly as a thickness estimate, when compensation errors are higher than a threshold. Tests on training data indicate that it is sufficient to test the error of the first observation point.

In an exemplary embodiment of the present invention, two thickness model candidates are introduced to model breast thickness: the logistic model and the semi-circle model. Both models satisfy the properties of a compressed breast mentioned earlier. Other models may also be used.

Figure 10B:
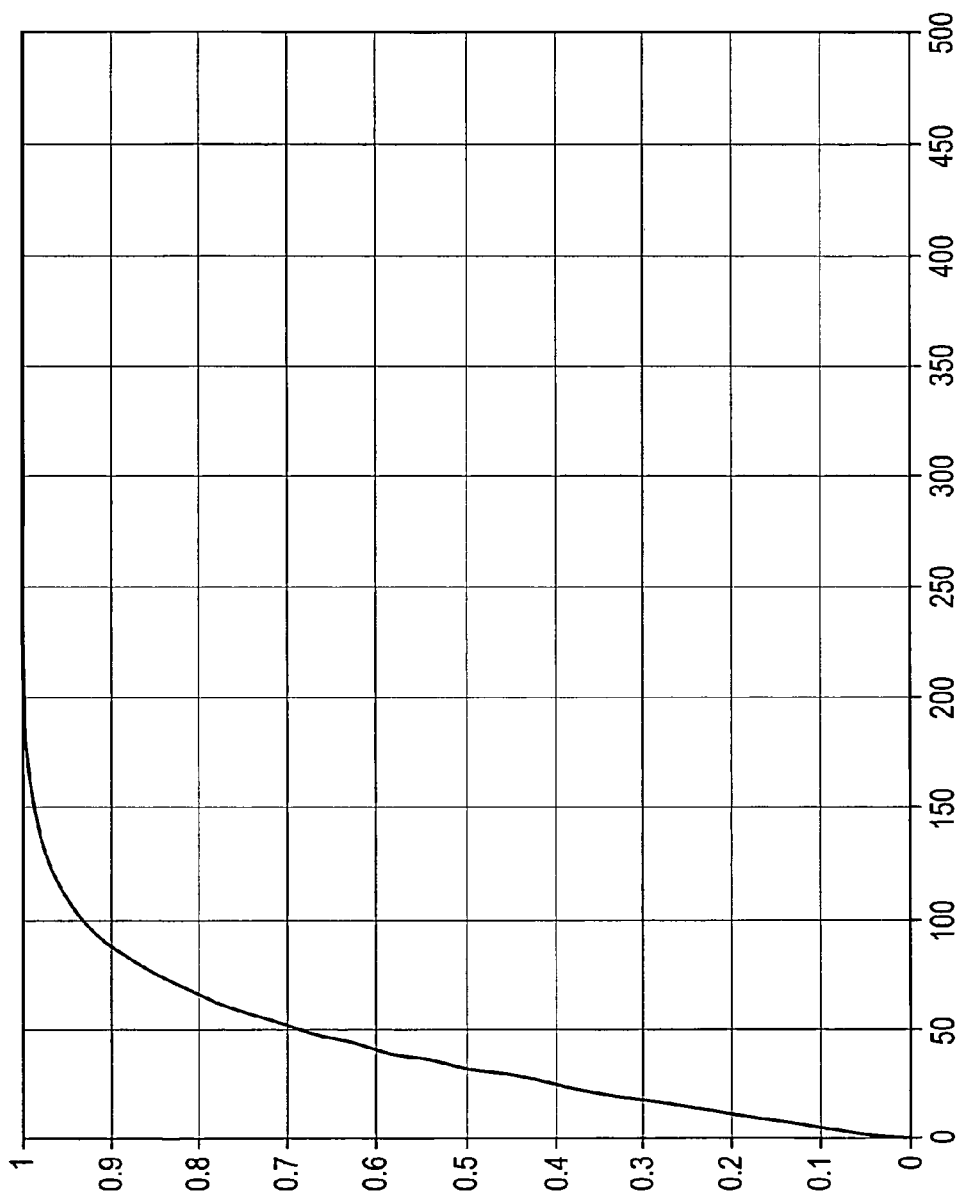
FIG. 10B illustrates an example of logistic model intensity with $A=1$ and $\lambda=30$ in accordance with principles of the present invention.

In the logistic model, a logistic function is defined by two parameters, A and λ. The logistic function is written as $$I(x; A, \lambda) = A\left(\frac{2}{1+e^{-\frac{x}{\lambda}}} - 1\right) \quad (1)$$

where x is the distance to skin line, and I is the average pixel intensity at a certain thickness. For breast thickness modeling, x is positive. A plot of the function (1) is shown in FIG. 10B, which illustrates an example of logistic model intensity with A=1 and λ=30.

Figure 10C:
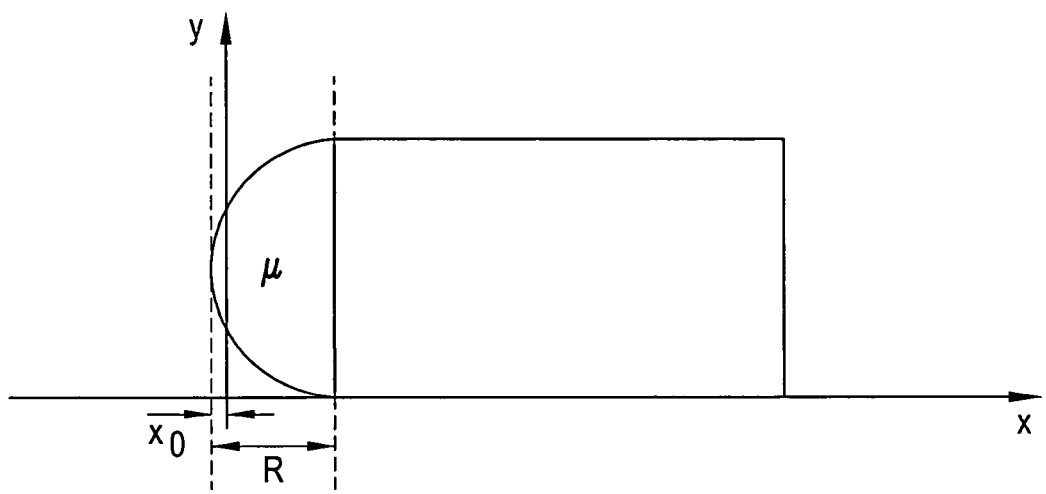
FIG. 10C illustrates a cross-section of a compressed breast in the semi-circle model in accordance with principles of the present invention.

A semi-circle model for breast compression was proposed in "Thickness Correction of Mammographic Images by Means of a Global Parameter Model of the Compressed Breast", by P. Snoeren et al., IEEE Transactions on Medical Imaging, Volume 23, Issue 7, July 2004, pages 799-806, the entire contents of which are hereby incorporated by reference. FIG. 10C illustrates a cross-section of a compressed breast in the semi-circle model. As shown in FIG. 10C, the semi-circle model assumes that the cross-section of a compressed breast consists of a semi-circle at the periphery of the breast, and two parallel lines in the fully compressed breast region.

The semi-circle model is characterized by three parameters: R, $x_0$ and μ. The intensity function is written as:

$$I(x; R, \mu, x_0) = \begin{cases} 2\mu\sqrt{2R(x+x_0)-(x+x_0)^2}, & x < R - x_0 \\ 2\mu R, & x \geq R - x_0 \end{cases} \quad (2)$$

Figure 10D:
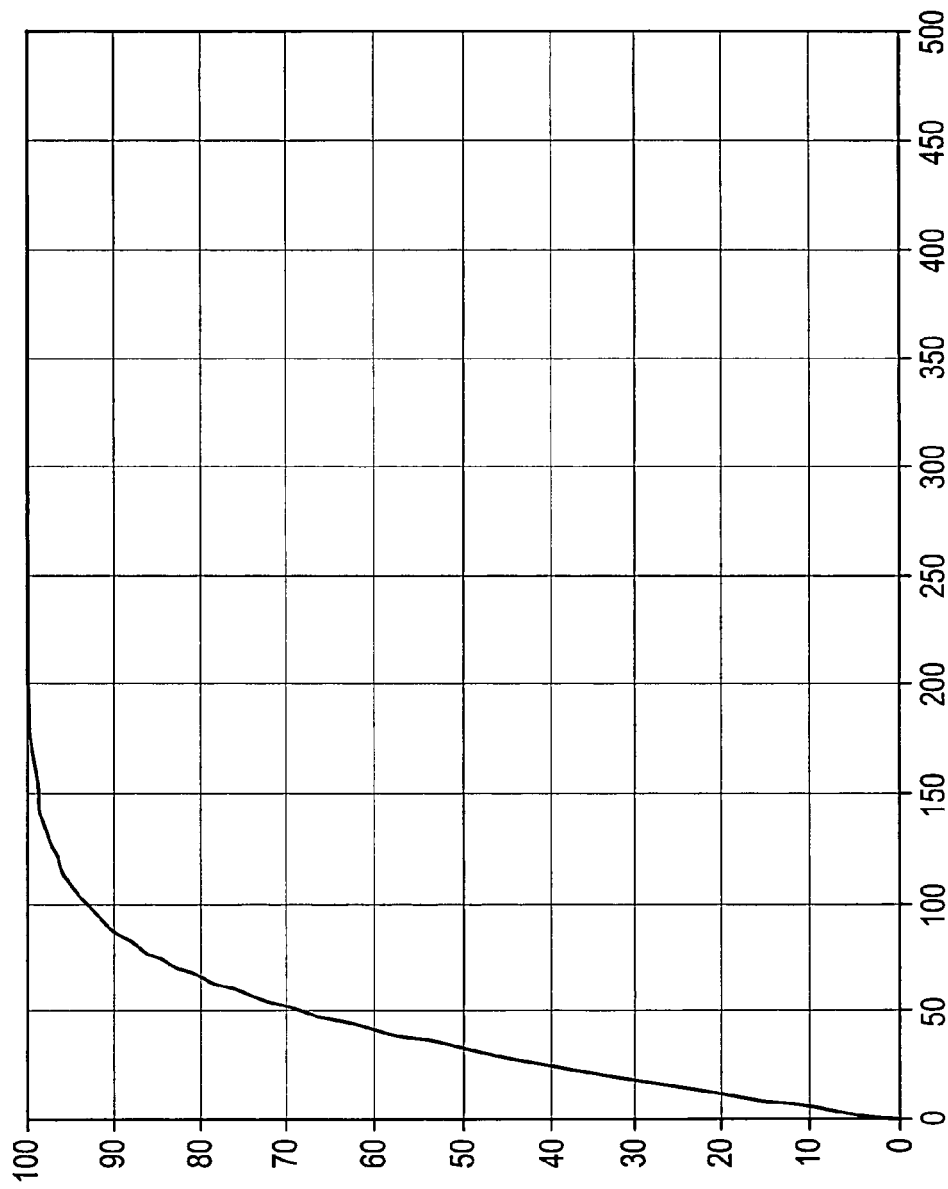
FIG. 10D illustrates an example of semi-circle model with parameters $R=100$, $x_0=30$, and $\mu=0.1$ in accordance with principles of the present invention.

The parameters of the semi-circle model have meaningful physical interpretations: R is a breast radius, $x_0$ is a horizontal offset, and μ is an attenuation coefficient for the breast. A plot of function (2) is shown in FIG. 10D, which illustrates an example for a semi-circle model with parameters R=100, $x_0$=30, and μ=0.1.

The consistency of breast tissue such as fatty tissue is used to benchmark the compression models (S603). Testing results show that both the logistic model and the semi-circle model fit compressed breasts well. The semi-circle model performs better overall. The performance of the semi-circle model is improved with good initialization for the underlying parameter search problem, to properly find an optimal solution for breast thickness. The logistic model, on the other hand, is more robust. In a preferred embodiment of the present invention, the logistic model is used for initialization of a semi-circle estimate for breast thickness (S605).

Figure 11A:
FIG. 11A is an original mammographic image.
Figure 11B:
FIG. 11B is a compensated image obtained from FIG. 11A, with a semi-circle compression model.

FIG. 11B illustrates limitations of a semi-circle model for breast compression proposed in "Thickness Correction of Mammographic Images by Means of a Global Parameter Model of the Compressed Breast", by P. Snoeren et al. FIG. 11A is an original mammographic image. FIG. 11B is the compensated image obtained from FIG. 11A, using a semi-circle compression model without a good initialization, as disclosed by P. Snoeren et al. Although the peripheral region of the breast is mostly equalized (compensated) in thickness, artifacts are present. For example, near the chest wall breast corner region labeled 1, the intensity of the image is higher that normal, even though the tissue in that region is fatty. In another region labeled 2, intensity fluctuations are present.

The problems that appear in the compensated image in FIG. 11B are caused by an inherent strong constraint that was placed by the compression model disclosed by P. Snoeren et al. That model assumes that all thickness variation in the breast occurs in a direction perpendicular to the skin line. Hence, thickness variation along directions parallel to the skin line is ignored. However, in real breast images, the randomness of each breast compression and the firm chest wall can cause thickness changes in directions perpendicular to the skin line, and in directions parallel to the skin line.

To solve problems associated with the semi-circle model, the present invention studies characteristics of thickness variation. One characteristic of thickness variation in breasts is that thickness typically changes slowly. Even though the firm chest wall can alter the compression of the breast, this altering effect propagates smoothly towards the interior of the breast. Skin folds, on the other hand, may cause abrupt thickness changes in a breast. However, skin folds can be avoided in breast images and are not needed in mammograms, since the Mammography Quality Standards Act (MQSA) does not require a skin fold in a mammogram.

In the present invention, the location of a full-compression line is estimated from results of the semi-circle estimate (S606). The location of the full-compression line can then be used to find a boundary between peripheral and interior regions in the breast (S607). In the interior region, the thickness of the breast is typically constant, and thickness compensation is not needed at that location.

Because thickness information is not directly available from image intensity of non-fatty regions, a previous thickness estimate (such as the estimate obtained with the semi-circle model) can be used in these regions.

Hence, compensation unit 150A receives the layer thickness estimate from thickness estimation unit 140, and performs adaptive compensation for the breast image. The estimate of thickness is fitted by the semi-circle model to obtain a continuous curve. An exemplary fitted curve using the semi-circle model is illustrated in FIG. 10A. To ensure correct compensation in the skin line area, weighting terms may be used with a least-squares fitting process, to obtain a continuous curve. For a selected objective grayscale level, compensation values can then be calculated.

To ensure continuity in the resulting images, the object level may set to be the grayscale level of the last layer, which is the layer furthest away from skin line. For example, in FIG. 10A the points furthest away from skin line are the points at the right side of the graph. A compensated image is obtained by adding the compensation levels back to corresponding layers (S613).

Figures 12A, 12B:
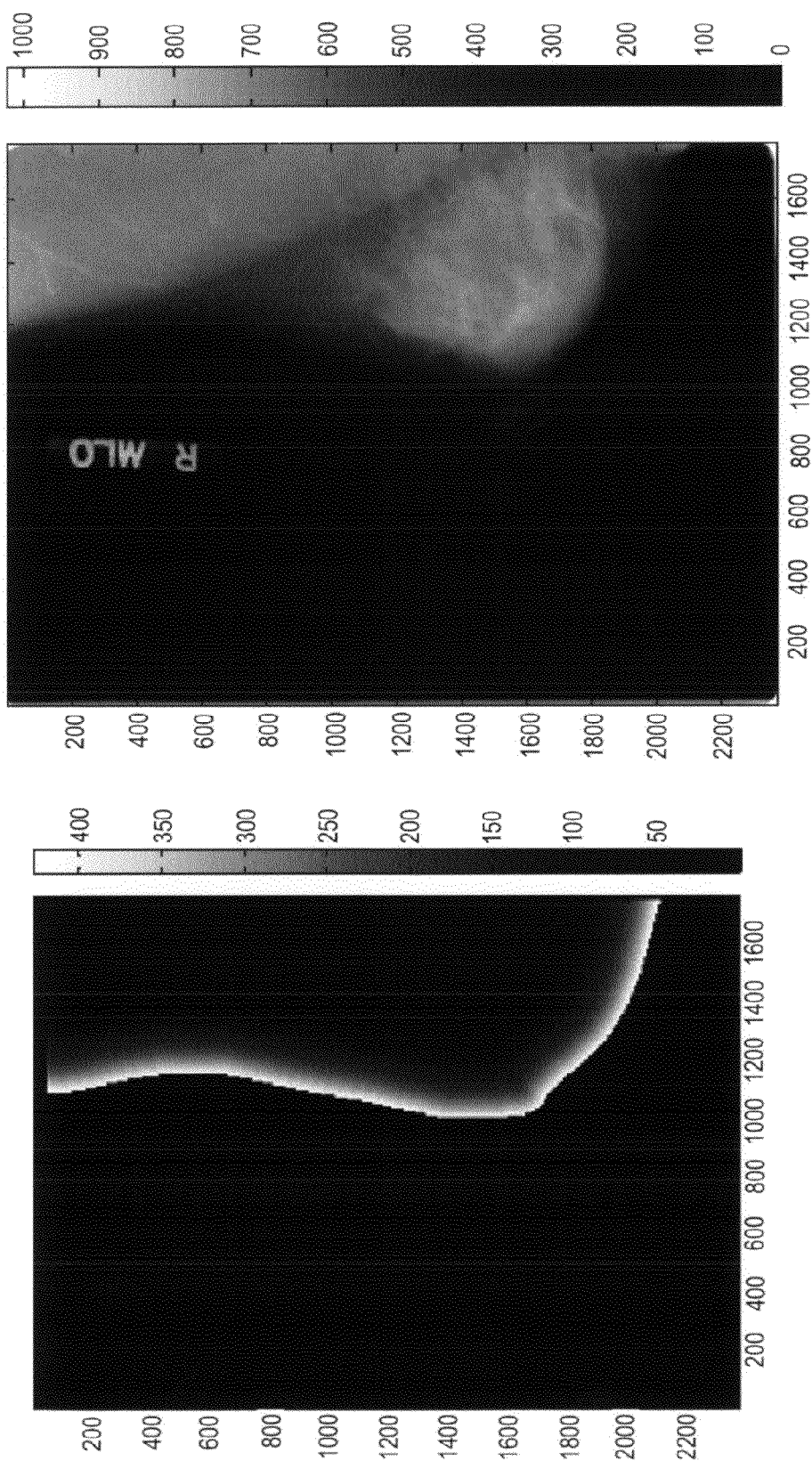
FIG. 12A illustrates an exemplary compensation values image obtained in accordance with principles of the present invention.
FIG. 12B illustrates an original mammogram image that was used to obtain the compensation values image of FIG. 12A in accordance with principles of the present invention.
Figure 12C:
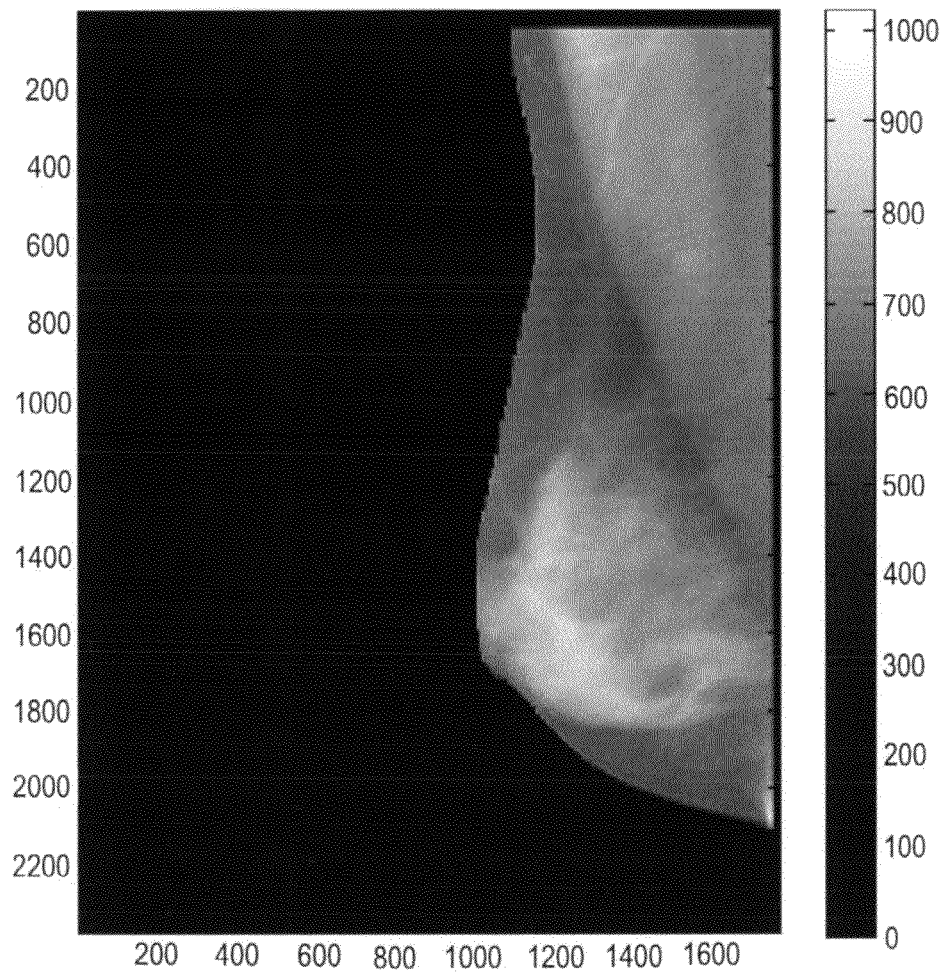
FIG. 12C illustrates a compensated breast image obtained by adding the compensation levels shown in FIG. 12A to corresponding layers in the original breast image in FIG. 12B in accordance with principles of the present invention.

An exemplary compensation values image is shown in FIG. 12A. For FIG. 12A, the object level was set to be the grayscale level of the last layer, which is the layer furthest away from skin line. FIG. 12B illustrates the original raw mammogram that was used to obtain the compensation values image in FIG. 12A. FIG. 12C illustrates the compensated breast image obtained by adding the compensation levels shown in FIG. 12A to the corresponding layers in the original breast image in FIG. 12B.

Figure 13:
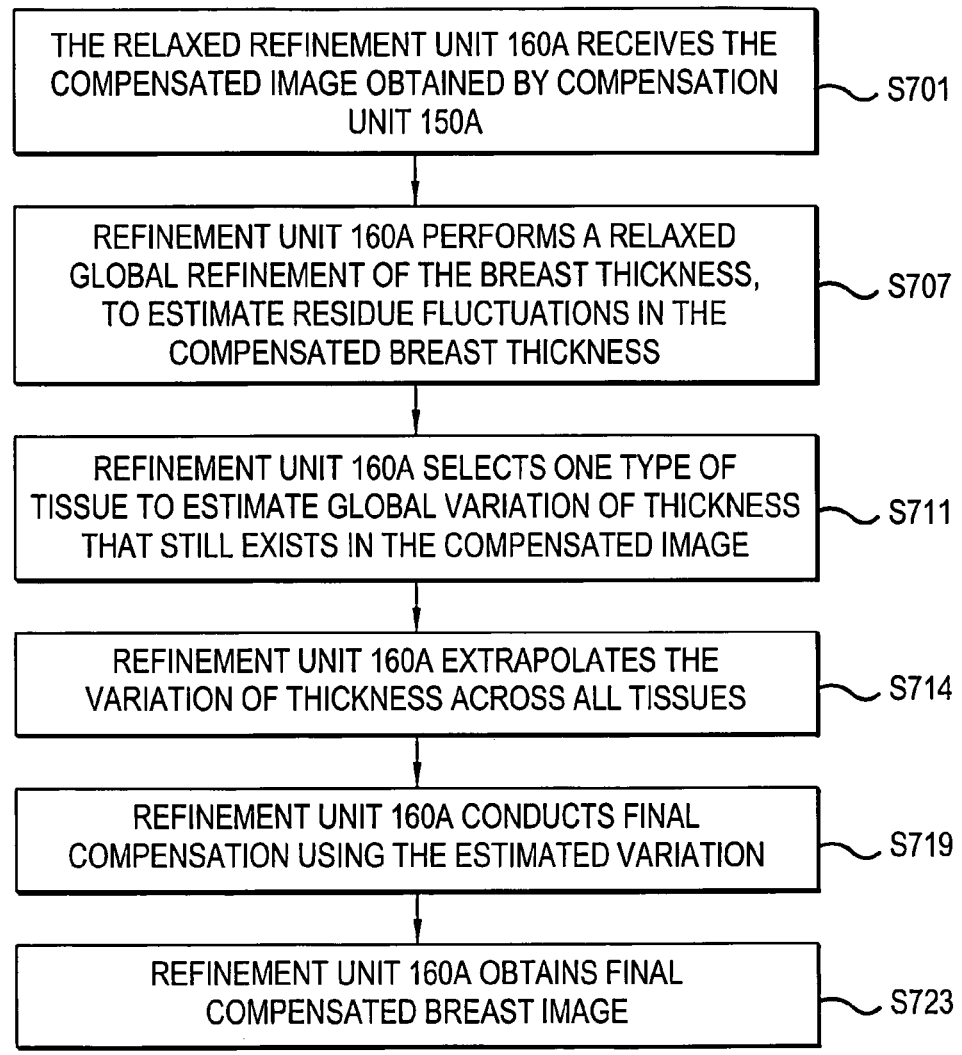
FIG. 13 is a flow diagram illustrating operations performed by a relaxed refinement unit included in an image processing unit for thickness compensation in mammography images according to an embodiment of the present invention illustrated in FIG. 3A.

FIG. 13 is a flow diagram illustrating operations performed by a relaxed refinement unit 160A included in an image processing unit 100A for thickness compensation in mammography images according to an embodiment of the present invention illustrated in FIG. 3A.

The relaxed refinement unit 160A receives the compensated image (herein called IMG01) obtained by the compensation unit 150A (S701). FIG. 12C represents an exemplary compensation image IMG01 received by the relaxed refinement unit 160A. The refinement unit 160A then performs a relaxed global refinement of the breast thickness, to estimate residue fluctuations in the compensated breast thickness (S707). Refinement unit 160A may use outlier detection to improve estimate of compression model parameters. The refinement unit 160A selects one type of tissue to estimate the global variation of thickness that still exists in IMG01 (S711). It then extrapolates the variation of thickness across all tissues (S714). Final compensation is conducted using the estimated variation (S719). Hence, the refinement unit 160A performs a relaxed global refinement based on a previously compensated image, to obtain a final compensated image. The refinement unit 160A may refine thickness compensation of the breast with a specific type of tissue, and extrapolate compensation to other types of tissue.

Figure 14A:
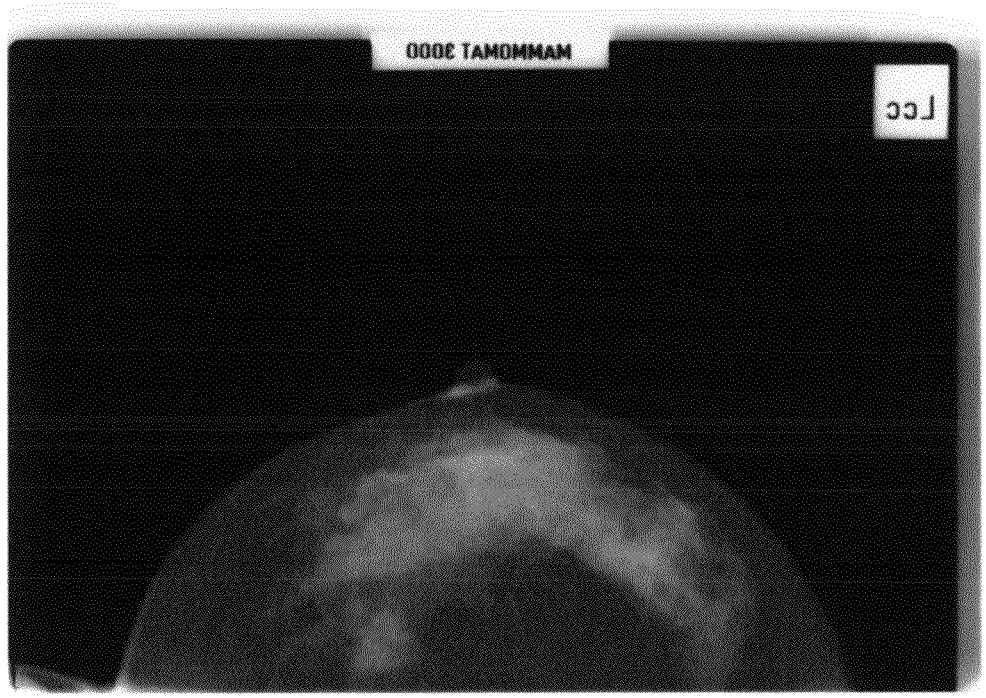
FIG. 14A is an exemplary final compensation result for the breast image in FIG. 11A, in accordance with principles of the present invention.
Figure 14B:
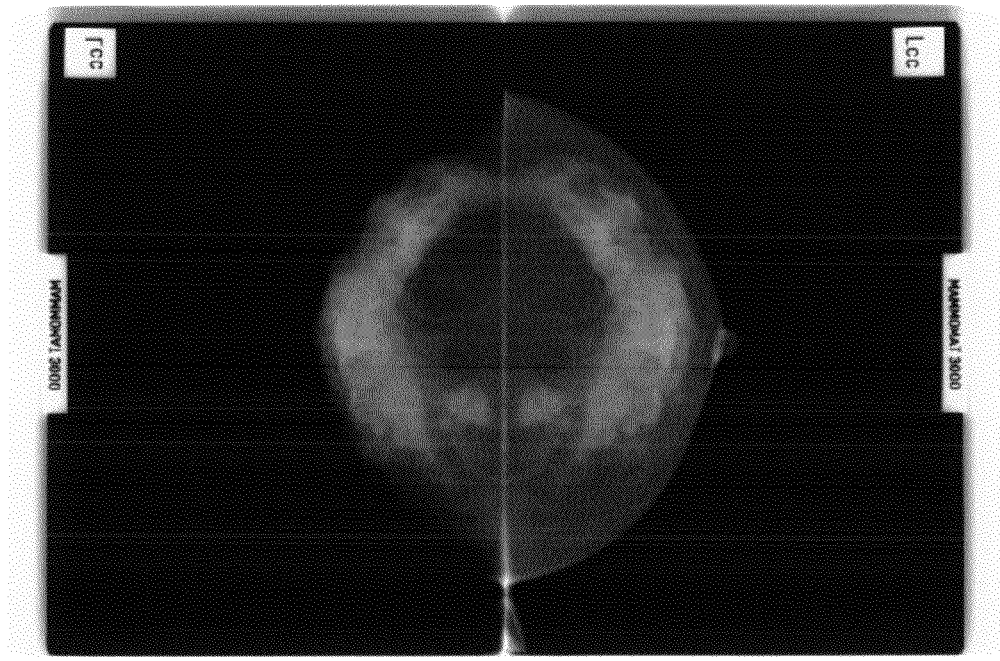
FIG. 14B illustrates the original image from FIG. 11A and the compensation image from FIG. 14A side by side, for comparison, in accordance with principles of the present invention.

FIG. 14A is an exemplary final compensation result for the breast image in FIG. 11A. FIG. 14B illustrates the original image from FIG. 11A and the compensation image from FIG. 14A side by side, for comparison.

The present invention describes methods and apparatuses that perform thickness compensation for breast images. A layer mapping step generates a layer map for a breast and estimates layer thickness within each layer. The thickness compensation framework uses a model based thickness estimate method, followed by a relaxed global refinement. The model and the outlier detection take into account properties of breast tissue and of breast compression. A strong model assumption is used for initial breast thickness compensation, and weak assumptions are used to refine thickness estimation. The refinement step performed after the model based thickness estimate process takes into account characteristics of breast compression, and imposes fewer constraints. In a preferred embodiment, the compensating step estimates layer thickness for the breast image using a semi-circle thickness model, and uses a logistic model to initialize a semi-circle estimate.

A strong assumption (or a strong compression model) may be an assumption (or a model) that relates to multiple geometrical properties. In an exemplary embodiment, a strong compression model may determine both continuity and 3D shape of a compressed surface. A weak assumption relates to fewer image properties than a strong assumption. In one embodiment, a weak assumption sets the continuity of a surface.

Although aspects of the present invention have been described in the context of mammography images, it should be realized that the principles of the present invention are applicable to other types of digital images besides mammography images, for thickness compensation of objects other than breasts. For example, the principles of the present invention are applicable for thickness compensation in images of other anatomical objects besides breasts, using a thickness or compression model of the anatomical object.

Although detailed embodiments and implementations of the present invention have been described above, it should be apparent that various modifications are possible without departing from the spirit and scope of the present invention.

We claim:

1. An image processing method, said method comprising:
   accessing digital image data representing an image including a breast;
   estimating thickness of said breast at multiple locations inside said breast using an image data characteristic and a reference tissue in said breast;
   compensating thickness of said breast using a thickness model to obtain a first set of compensated values for thickness estimates from said estimating step;
   refining compensation of breast thickness from said compensating step by refining said first set of compensated values, to obtain a second set of compensated values for breast thickness values; and
   generating an image including the breast having compensated thickness according to said second set of compensated values, responsive to said refining.

2. The image processing method as recited in claim 1, wherein said estimating step uses reference tissue information or breast segmentation data of said breast for obtaining a thickness reference.

3. The image processing method as recited in claim 1, wherein said image is a breast compressed in a mammography machine, and said thickness model is a thickness model of breast compression.

4. The image processing method as recited in claim 1, wherein a strong model assumption is used in said compensating step for initial thickness compensation, and weak assumptions are used in said refining step.

5. The image processing method as recited in claim 1, wherein said compensating step performs adaptive compensation for the breast image.

6. The image processing method as recited in claim 1, wherein said compensating step estimates thickness using a thickness model of breast compression.

7. The image processing method as recited in claim 1, wherein said compensating step estimates layer thickness for a breast image using a semi-circle thickness model, and uses a logistic model to initialize a semi-circle estimate.

8. The image processing method as recited in claim 1, wherein said reference tissue is fatty tissue which is used to estimate thickness within and across layers in said breast.

9. The image processing method as recited in claim 1, wherein said compensating step uses information from said reference tissue.

10. The image processing method as recited in claim 1, wherein said refining step uses outlier detection to improve estimate of compression model parameters.

11. The image processing method as recited in claim 1, wherein said refining step refines thickness compensation of said breast with a specific type of tissue, and extrapolates compensation to other types of tissue.

12. The image processing method as recited in claim 1, further comprising a segmentation step for generating a tissue mask indicating location of said reference tissue in said breast.

13. The image processing method as recited in claim 1, wherein said image data characteristic includes grayscale values for pixels of said reference tissue.

14. The image processing method as recited in claim 1, wherein said refining step refines compensation of breast thickness using a weak assumption.

15. An image processing method, said method comprising:
   accessing digital image data representing an image including a breast;
   estimating thickness of said breast at multiple locations inside said breast using an image data characteristic and a reference tissue in said breast;
   compensating thickness of said breast using a thickness model;
   refining compensation of breast thickness from said compensating step; and
   generating an image including the breast having compensated thickness, responsive to said refining, and
   further comprising a layer mapping step that generates a layer map and estimates layer thickness within each layer.

16. The image processing method as recited in claim 15, wherein said compensating step uses thickness of layers to estimate compression model parameters.

17. An image processing method, said method comprising:
   accessing digital image data representing an image including a breast;
   estimating thickness of said breast at multiple locations inside said breast using an image data characteristic and a reference tissue in said breast;
   compensating thickness of said breast using a thickness model;
   refining compensation of breast thickness from said compensating step; and
   generating an image including the breast having compensated thickness, responsive to said refining,
   wherein said refining step performs a relaxed global refinement based on a previously compensated image from said compensating step, to obtain a final thickness compensated breast image.

18. An image processing apparatus, said apparatus comprising:
   an image data input unit for accessing digital image data representing an image including a breast;
   a thickness estimation unit for estimating thickness of said breast at multiple locations inside said breast using an image data characteristic and a reference tissue in said breast;
   a compensation unit for compensating thickness of said breast using a thickness model, to obtain a first set of compensated values for thickness estimates from said thickness estimation unit; and
   a refinement unit for refining compensation of breast thickness from said compensation unit by refining said first set of compensated values, to obtain a second set of compensated values for breast thickness values.

19. The apparatus of claim 18, wherein said estimation unit uses reference tissue information or breast segmentation data of said breast for obtaining a thickness reference.

20. The apparatus of claim 18, wherein said breast is a breast compressed in a mammography machine, and said thickness model is a thickness model of breast compression.

21. The apparatus of claim 18, wherein a strong model assumption is used by said compensation unit for initial thickness compensation, and weak assumptions are used by said refinement unit.

22. The apparatus of claim 18, wherein said compensation unit performs adaptive compensation for the breast image.

23. The apparatus of claim 18, wherein said compensation unit estimates thickness using a thickness model of breast compression.

24. The apparatus of claim 18, wherein said compensation unit estimates layer thickness for a breast image using a semi-circle thickness model, and uses a logistic model to initialize a semi-circle estimate.

25. The apparatus of claim 18, wherein said reference tissue is fatty tissue which is used to estimate thickness within and across layers in said breast.

26. The apparatus of claim 18, wherein said compensation unit uses information from said reference tissue.

27. The apparatus of claim 18, wherein said refinement unit uses outlier detection to improve estimate of compression model parameters.

28. The apparatus of claim 18, wherein said refinement unit refines thickness compensation of said breast with a specific type of tissue, and extrapolates compensation to other types of tissue.

29. The apparatus of claim 18, further comprising a segmentation unit for generating a tissue mask indicating location of said reference tissue in said breast.

30. The apparatus of claim 18, wherein said image data characteristic includes grayscale values for pixels of said reference tissue.

31. The apparatus of claim 18, wherein said refinement unit refines compensation of breast thickness using a weak assumption.

32. An image processing apparatus, said apparatus comprising:
   an image data input unit for accessing digital image data representing an image including a breast;
   a thickness estimation unit for estimating thickness of said breast at multiple locations inside said breast using an image data characteristic and a reference tissue in said breast;
   a compensation unit for compensating thickness of said breast using a thickness model; and
   a refinement unit for refining compensation of breast thickness from said compensation unit, and
   further comprising a layer mapping unit for generating a layer map and estimating layer thickness within each layer.

33. The apparatus of claim 32, wherein said compensation unit uses thickness of layers to estimate compression model parameters.

34. An image processing apparatus, said apparatus comprising:
   an image data input unit for accessing digital image data representing an image including a breast;
   a thickness estimation unit for estimating thickness of said breast at multiple locations inside said breast using an image data characteristic and a reference tissue in said breast;
   a compensation unit for compensating thickness of said breast using a thickness model; and
   a refinement unit for refining compensation of breast thickness from said compensation unit,
   wherein said refinement unit performs a relaxed global refinement based on a previously compensated image from said compensation unit, to obtain a final thickness compensated breast image.

35. An image processing method, said method comprising:
   accessing digital image data representing an image including an anatomical object;
   estimating thickness of said anatomical object at multiple locations inside said object using an object image data characteristic and a reference tissue in said object;
   compensating thickness of said object using a thickness model, to obtain a first set of compensated values for thickness estimates from said estimating step;
   refining compensation of object thickness by refining, said first set of compensated values, to obtain a second set of compensated values for object thickness values; and
   generating an image including the anatomical object having compensated thickness according to said second set of compensated values, responsive to said refining.

* * * * *